United States Patent [19]

Näther et al.

[11] Patent Number: 5,477,141
[45] Date of Patent: Dec. 19, 1995

[54] REGISTRATION ARRANGEMENT FOR MOTOR VEHICLES WITH A MEASURED VALUE PRESENTATION SUITABLE FOR EVALUATING ACCIDENTS

[75] Inventors: Horst Näther; Norbert Lais, both of Villingen-Schwenningen, Germany

[73] Assignee: VDO Kienzle GmbH, Villingen, Germany

[21] Appl. No.: 69,461

[22] Filed: Jun. 1, 1993

[30] Foreign Application Priority Data

Jun. 4, 1992 [DE] Germany .................. 42 18 397.9

[51] Int. Cl.⁶ .................. G06F 13/00; G01P 3/42
[52] U.S. Cl. .................. 324/160; 364/424.04
[58] Field of Search .................. 324/160, 166, 324/168; 364/424.03, 424.04

[56] References Cited

U.S. PATENT DOCUMENTS 4,987,541  1/1991  Levente et al. .................. 364/424.04

*Primary Examiner*—Walter E. Snow
*Attorney, Agent, or Firm*—Anderson Kill Olick & Oshinsky

[57] ABSTRACT

A device for short-distance recording for motor vehicles is disclosed for the evaluation of an accident or near-accident driving situation. A storage arrangement is provided in which speed measurements are simultaneously written into at least two parallel storage branches. A plurality of time-limited storage areas are defined in each storage branch. Each storage area has a storage portion which can be operated as a ring storage and a storage portion arranged subsequent to the latter which can be operated as a linear storage. The speed values, which are written into the ring storage in a continuous manner during the course of normal driving, are permanently stored in one storage branch when the criterion v equal to 0 km/hr occurs, and in the other storage branch when the criterion a greater than a deceleration threshold value occurs. Subsequent speed values are written into the linear storage of the respective storage area until the set time limit, after which a free storage area of the respective storage branch is switched to.

12 Claims, 6 Drawing Sheets

REGISTRATION ARRANGEMENT FOR MOTOR VEHICLES WITH A MEASURED VALUE PRESENTATION SUITABLE FOR EVALUATING ACCIDENTS

FIELD OF THE INVENTION

The present invention is directed to a device for short-distance recording for motor vehicles with an arrangement for electronically storing speed values in such a way that they enable an immediate evaluation of an accident or near-accident driving situation by displaying and/or printing.

BACKGROUND OF THE INVENTION

As is well known, short-distance, or residual-distance, recording in motor vehicles is used for analyzing the last distance traveled before a stop, possibly a stop which is caused by a collision, in an improved manner in comparison with tachograph charts. A wide range of recording principles are already known for devices of this type such as, for example, principles which enable immediate examination of the recordings, as well as those in which speed values are generally written into an electronic storage, continuously in a determined clock cycle as data records, sometimes together with other data, the least current data records being erased.

Of course, in relation to speed checks or an evaluation of an accident when the vehicle is stopped, such a device may continue to store zero speed values which are generated in a clocked manner only for a limited period of time sufficient for reliably detecting a stationary state. Accordingly, a known storage process marks the restarting of the vehicle by entering the starting time in the respective storage.

On the other hand, special accident recording devices are known in which accident data are determined, preferably by means of acceleration sensors, and stored for a relatively brief period, in a time-based manner, wherein additional information which concerns, for example, brake actuation, blinker operation and illumination, is compiled as an interpretation aid. Such a device permanently stores the accident data when the vehicle actually undergoes accelerations beyond the range of possible accelerations which are brought about by the nature of the road and the driving dynamics, i.e. in the event of genuine impacts caused by traffic accidents. In this way, the processor capacity and storage space can be confined to authentic accident situations.

Recordings made by devices of the first group can provide a certain support for recording and interpreting accidents in that the speed curve, which precedes the stopping of the vehicle, is analyzed on the spot and status data, which has been compiled such as "brakes applied", "blinker on" and the like, can be taken into account regardless of whether or not the vehicle has undergone an impact resulting from an accident. However, the actual reaction of the driver, the driving situations which resulted neither in a stopping of the vehicle nor in a collision, or hit-and-run situations, cannot be detected because these recordings are overwritten when the vehicle resumes driving. The same can also be said of the devices, which exclusively record collisions. While these devices enable an exact analysis of the events which precede and which follow an accident, this analysis can only be undertaken by experts. Also, the cost of such devices generally exceeds the acceptable limits for monitoring devices, which are not required by law, especially since they are used relatively rarely or not at all for the entire operating life of a vehicle. On the other hand, the first group of devices can be used much more frequently, namely, such as for traffic checks.

SUMMARY OF THE INVENTION

The object of the present invention is to provide for a device for short-distance recording for motor vehicles, which can be realized at a compatible cost, and which supplies recordings which go beyond a speed recording as such and which can also be interpreted without data processing equipment and without special expertise.

The device according to the present invention meets the proposed object and offers the advantage that the desired record can be achieved exclusively with signals or with distance transmitters which are already present in motor vehicles. That is, the proposed object can be met not only at an extremely low cost, as there are no high technical costs, e.g. acceleration sensors and angle sensors, but it also operates in a reliable manner since it makes use of proven technology.

It is also important that the device, which is the subject of the present invention, can be easily installed as an autonomous device insofar as such a device occupies little space, need not necessarily be arranged in the region of the dashboard, and is not reliant on attitude or position. The preconditions for the voluntary installation of such a device are accordingly met. It is also advantageous that the device can be integrated easily in a wide range of different vehicle devices, particularly in those which process pulses which are generated as a function of distance. Since the memory requirement is small, due to the fading out of the time windows, the device can also be functionally integrated. In other words, redundant storage and processor capacity can be made use of in electronically controlled display and/or recording devices.

It is also worth noting, with regard to accident records carried out by police, traffic checks, and hit-and-run situations, that the device offers a record which is optimally tailored to requirements and is an aid to interpretation which is extensively incontrovertible in that it is limited to only one measurement variable, i.e. speed, from which the acceleration can be mathematically derived.

As a result of the parallel storage of identical speed measurements in identical storage areas, which are laid out as a time window sufficient for determining events which lead up to and following an incident, the providing of a plurality of such storage areas in the respective parallel storage branches, the selection of permanent storage criteria, i.e., v equal to 0 and a greater than a deceleration threshold X, which can cause an exit from the current storage area, a large number of driving situations can be determined, and subsequently visualized, since at least one relative value for the instantaneous clock time and for the mileage status, if necessary, are determined in addition to when one of the permanent storage criteria occurs. Tampering by overwriting, i.e. by deliberately bringing about driving situations which cause further storage in a new storage area, is made substantially more difficult as a result of the multitude of storage areas.

In the event of an accident, which is recorded on the scene by the police, the most recently terminated or closed storage areas supply supplementary information, particularly that concerning the speed curve prior to the incident, but also that concerning the reaction of the driver with respect to his braking behavior. Accordingly, a statement can also be obtained on the scene as to whether or not the driver involved in the accident has maintained the legal speed limit and whether or not he had to apply emergency braking at an initial speed beyond the legal speed limit. In order to avoid disputes in interpreting the speed curve, it is conceivable, in this regard, i.e. when the recommended speed has been exceeded, to compare the actual speed curve with a speed profile which is pertinent to the assignment of fault and to the display and/or the print-out of only a yes/no statement.

The storage contents can be read out by a high-resolution, graphic or numeric display which is installed in the police vehicle and on a printer. In particular, the printing device can be present in the police vehicle and can also be assigned to the detecting device.

In the case of traffic control, particularly hit-and-run searches, the prior storage areas, which have not yet been overwritten, can provide a key as to whether or not the vehicle, at a determined point in time, had come to a stop or had undergone a sharp braking or, when one or more impact sensors are also used, had an impact. Hit-and-run situations, in which a vehicle continued to drive without having braked, with sufficient braking force, to attain a fixed deceleration threshold, e.g. after glancing off a parked vehicle or running into a vehicle, can be deciphered by means of impact sensors the embodiment of which, however, require cables.

Accordingly, it is an object of the present invention to provide for a device, for short-distance recording for motor vehicles, which can be realized at a compatible cost, and which supplies recordings which go beyond a speed recording as such and which can also be interpreted without data processing equipment and without special expertise.

It is another object of the present invention to provide for a device which provides for the advantage that the desired record can be achieved exclusively with signals or with distance transmitters which are already present in motor vehicles.

It is still another object of the present invention to provide a device which can be easily installed as an autonomous device insofar as such a device occupies little space, need not necessarily be arranged in the region of the dashboard, and is not reliant upon attitude or position.

It is yet another object of the present invention to provide for a device which can be integrated easily in a wide range of different vehicle devices, and particularly, in those which process pulses which are generated as a function of distance.

It is still another object of the present invention to provide for a device wherein redundant storage and processor capacity can be made use of in electronically controlled display and/or recording devices.

Other objects and advantages of the present invention will be made apparent to those persons skilled in the art upon a review of the Description of the Preferred Embodiment taken in conjunction with the Drawings which follow.

DETAILED DESCRIPTION OF THE PREFERRED EMBODIMENT

Figure 1:
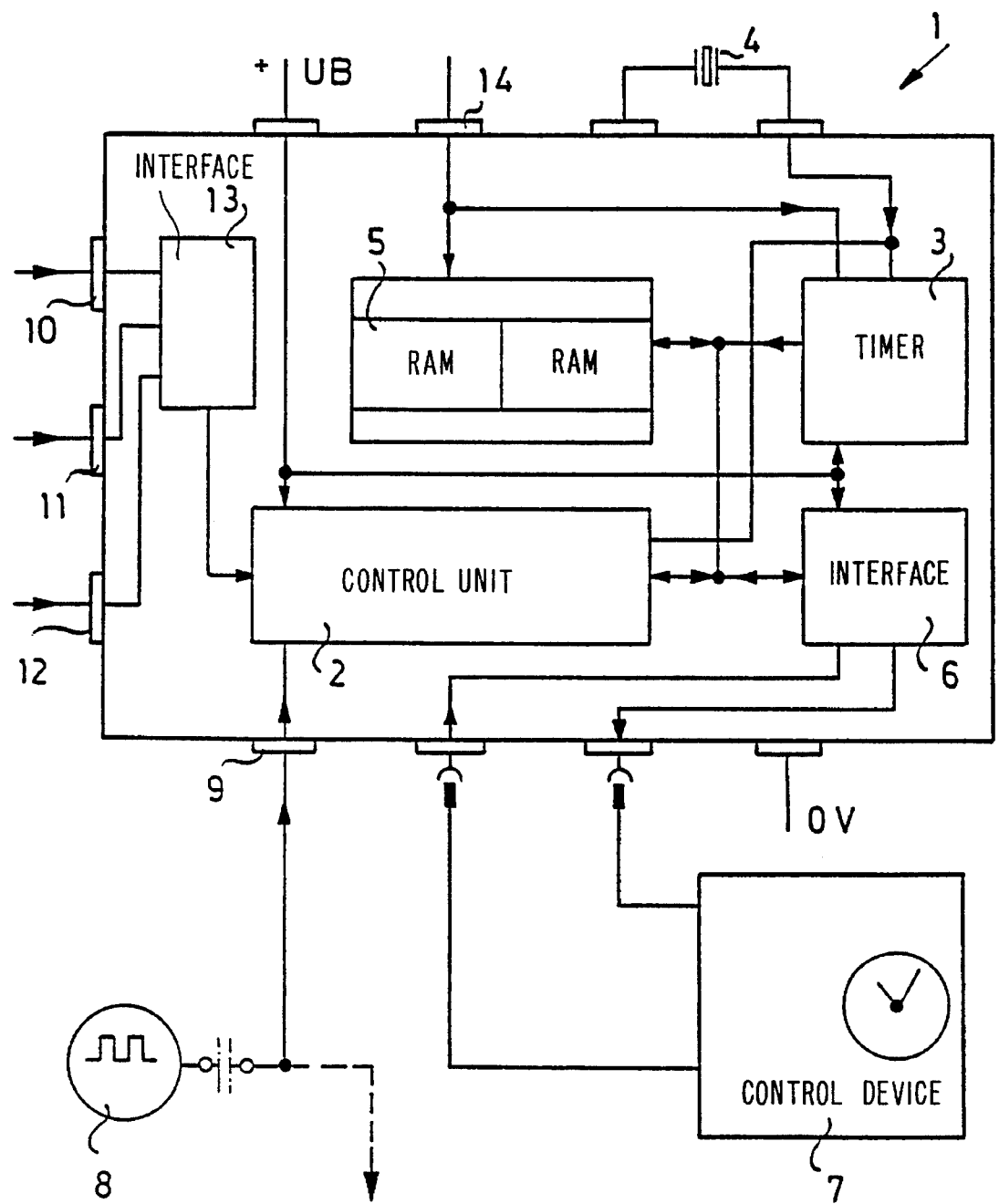
FIG. 1 illustrates a block wiring diagram which is projected into an integrated module and which shows the device according to the present invention along with the associated peripheral devices.

The block wiring diagram in FIG. 1 illustrates a module 1 in which are integrated the functional elements of the device according to the present invention, which communicate with one another via control lines (not shown) and via a bus system. In particular, these functional elements include a control unit 2, which can be constructed for the desired application as a simple logical circuit or as a processor, with the system program being loaded into its ROM, a timer 3, which is coupled with an externally associated piezoelectric crystal 4, and which is not necessarily constructed as a time-of-day/date clock, a storage arrangement, i.e. a RAM 5, in which speed values are permanently stored in a plurality of separate storage branches according to various defined criteria, and an interface 6 for connecting a control device 7, which can be used in any vehicle, and which is portable, if necessary, and which is outfitted with a suitable display and/or a printer. The first distance adaptation which is undertaken can be re-calibrated via this control device 7 and the date and current clock time can be fed to the short-distance recording device for calculating the time of an event.

A transmitter, which supplies distance-dependent pulses and which is usually already present in the respective vehicle, in which the device of the present invention is to be provided for measuring speed and/or mileage is designated by the reference numeral 8. It is advisable to provide optional inputs 10, 11 and 12, in addition to the input 9, for the distance pulse generator 8 and a suitable interface circuit 13, e.g. for one or more impact sensors, a speed transmitter, e.g. so as to determine driving in an inappropriate gear, and static transmitters, such as a steering angle transmitter and a brake contact, so that additional data, which can not be easily obtained in an accident recording or traffic check, can be optionally acquired. A buffer battery is externally associated via the connection contact 14.

Figure 2:
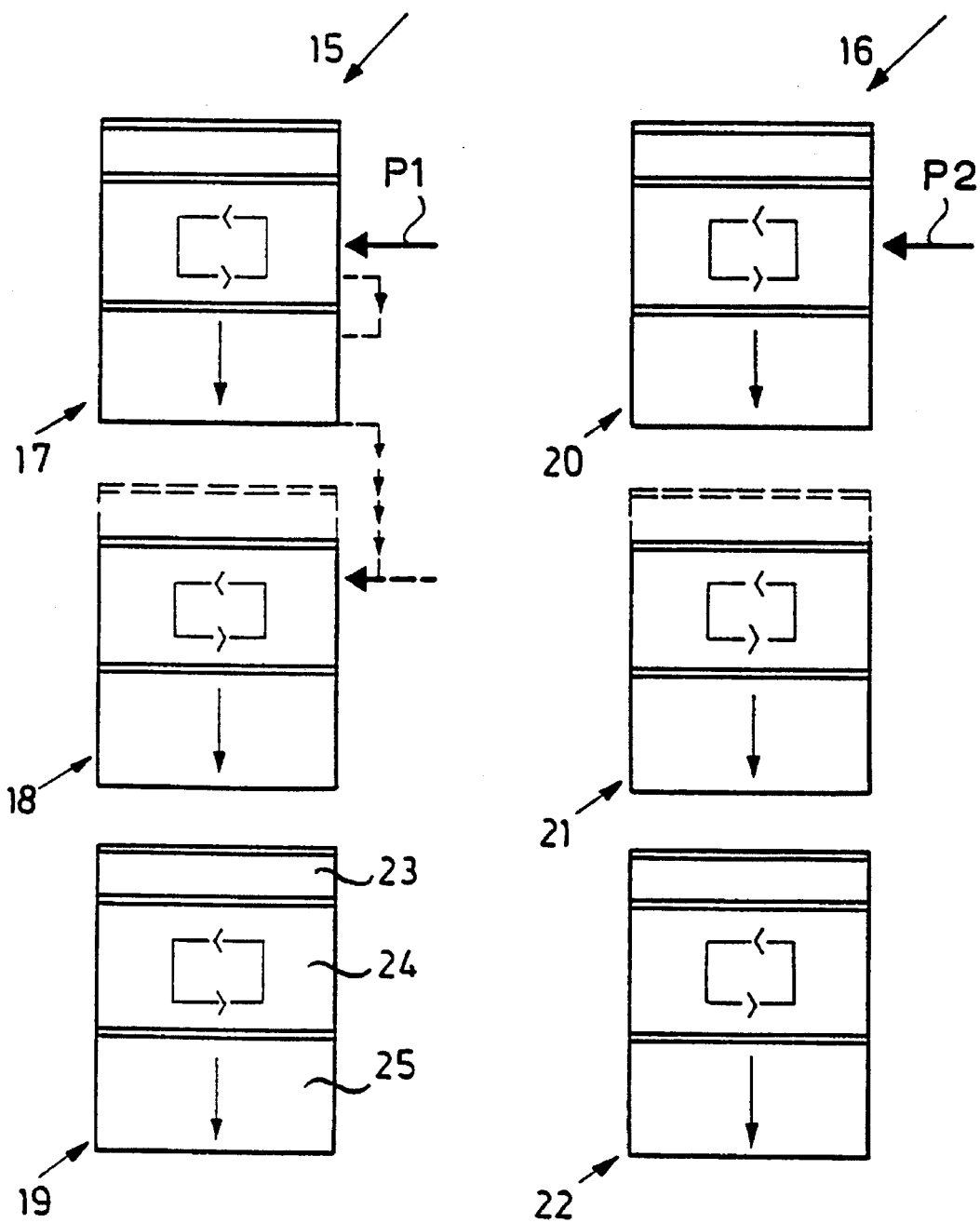
FIG. 2 illustrates a diagrammatic view of the storage area partitioning and of the storage administration.

The diagrammatic view in FIG. 2 illustrates that the RAM 5, which is preferably constructed as a CMOS-RAM and which may, in the future, be replaceable with an EPROM so that a buffer can be dispensed with, is divided into at least two storage branches 15 and 16 and, within the storage branches 15 and 16, into a plurality of storage areas 17, 18 and 19 and 20, 21 and 22, respectively.

The number of storage branches which are provided for the selected permanent storage criteria, and particularly, the number of storage areas within the storage branches in FIG. 2, can be expanded as desired. The reason for arranging three storage areas in each storage branch is that at least two accidents or near-accident situations can be fully accommodated in a reliable manner. Each storage area, which is shown in greater detail by storage area 19, includes a storage portion 23, for identification data, a storage portion 24, which is organized as a ring storage and into which speed values are read continuously before the occurrence of the permanent storage criterion, which is selected for the respective storage branch, and a storage portion 25, which is operated as a linear storage and in which speed values continue to be stored for a determined period of time following the respective incident. A storage depth of 1 minute is established for the ring storages as well as for the subsequent linear storages so that the events which lead up to, and which follow, an incident can be visualized within a time window of 2 minutes.

As noted above, it is provided that digital speed values are stored synchronously in the two storage branches 15 and 16 completely independently of one another, e.g. in a half-second cycle and the permanent storage criteria, the occurrence of which causes an exit from the current ring storage are v equal to 0, for storage branch 15, and a greater than a deceleration threshold X, e g 5.5 m/sec$^2$, for the storage branch 16.

Figure 3:
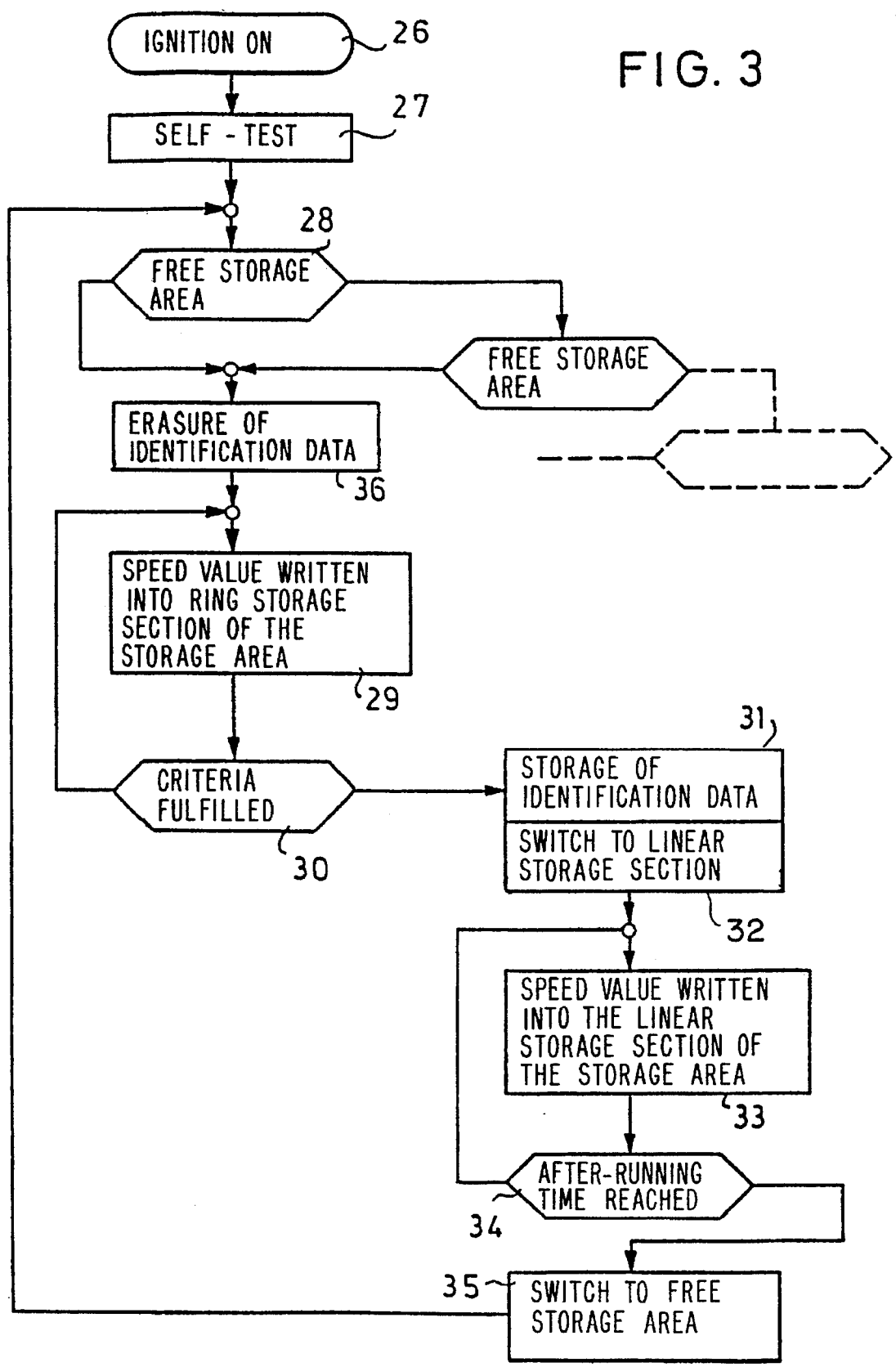
FIG. 3 illustrates a flow chart of the function flow in a storage area of a storage branch.

The steps by which the speed values, which are measured from the transmitter (generator) pulses, are stored are described below with reference to the flow chart, which is illustrated in FIG. 3, which applies to the respective storage areas of the two storage branches 15 and 16.

After the ignition 26 of the respective vehicle is switched on, the control unit 2 can first perform a programmed self-test 27 during which the connected transmitters are also checked. The system then inquires 28 as to which of the ring storages of the storage areas 17, 18, 19 and 20, 21, 22 is available. The first of the storage areas 17 or 20 must be overwritten because the last, 19 or 22, of the storage branches 15 or 16 contains data. When speed values occur which are calculated from the distance pulses which are supplied by the transmitter 8, these speed values are written 29 into the respective ring storage via the address pointers P1 and P2 until a permanent storage criterion is fulfilled 30, i.e. v equal to 0 has been detected for storage branch 15 and a greater than 5.5 m/sec$^2$ has been calculated for storage branch 16. When such an event occurs, the last status of the revolving address pointer P1 or P2, the time of the event, the mileage, and, if desired, a vehicle identification, are entered 31 into the respective storage portion 23.

The subsequent storage portion is then switched to 32 and speed zero values 33 are written into this subsequent storage portion as long as the vehicle is stationary, or speed values are stored when the vehicle is again put in motion. As noted above, a depth of 1 minute is provided for the respective storage portion 25. When this after-running time is reached 34, the respective storage area 17, 18 or 19 and 20, 21 or 22, respectively, is exited from as a result of meeting a permanent storage criterion 30 and, when speed values are present, the ring storage of the following storage area is started 35. The data of the storage portion, for identification data, which is associated with this storage area, are simultaneously erased 36.

Figure 4:
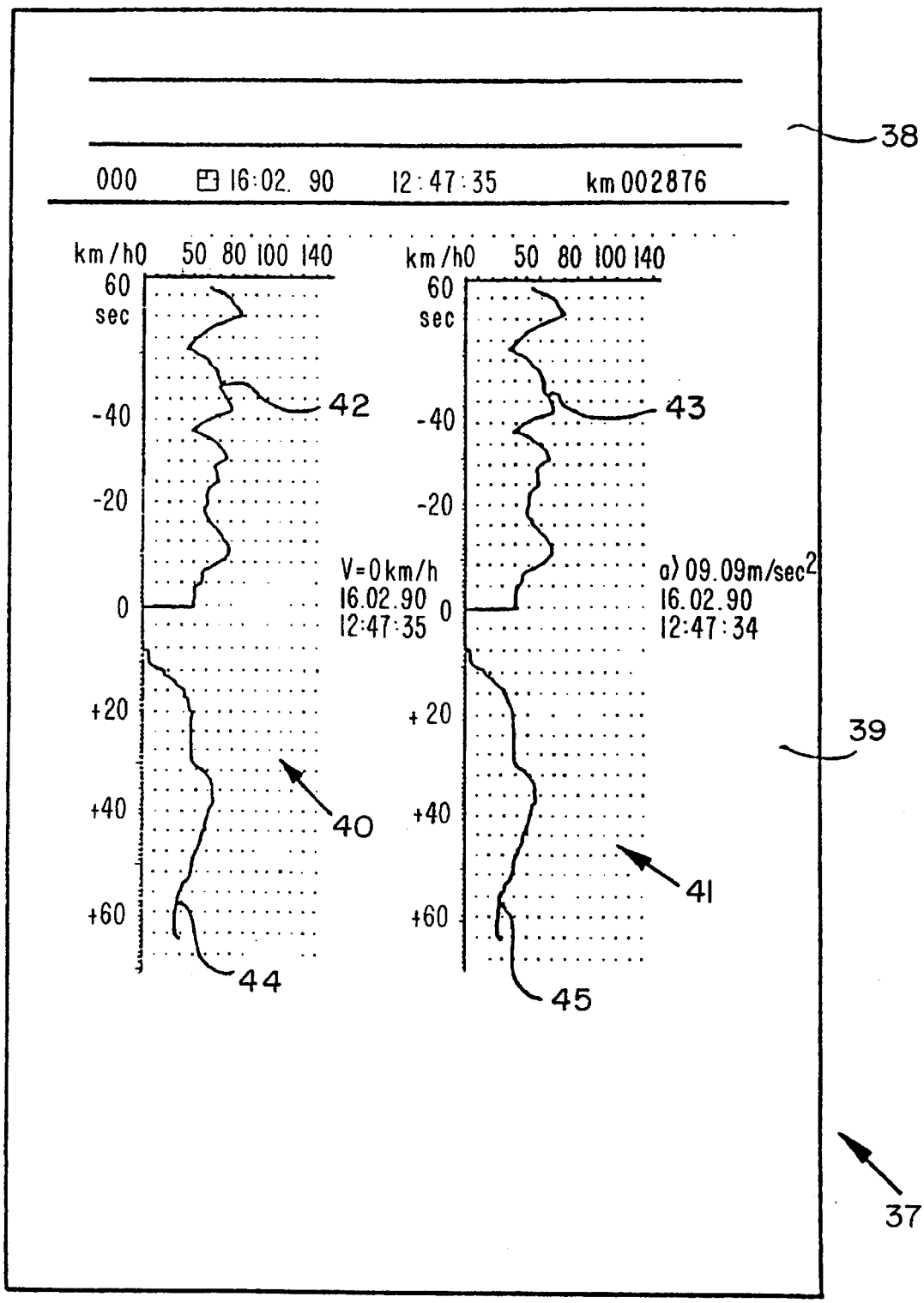
FIG. 4 illustrates a sample printout of a completed storage cycle which is not the last storage cycle.

FIG. 4 illustrates a sample print-out, and specifically, for a print medium 37 which is in sheet form. Identification data for the vehicle, date and time of print-out, identification of storage areas, date and time of the event, and mileage, are printed out at the top 38 of the print medium 37. Speed charts of the storage branches 15 and 16, which have been permanently stored as a result of a stop or a sharp braking, are printed out parallel to one another in the field 39 of the print medium 37.

Since the speed charts do not conclude with v equal to 0, the contents of the storage areas, which contain a prior storage cycle, which was concluded during a trip after the expiration of the after-running time, are illustrated in FIG. 4. The speed chart 40, which is filed in a storage area of the storage branch 15 is, by definition, identical to the speed chart 41, which is filed in a storage area of the storage branch 16 if, as in the present case, the brakes were applied with a deceleration a greater than 5.5 m/sec$^2$ prior to vehicle stopping (v equal to 0). Both permanent storage criteria were accordingly met. The chart portions 42 and 43 illustrate the respective ring storage contents. Chart portions 44 and 45 illustrate the contents of the following linear storages of the respective storage areas. As can be seen from FIG. 4, the most important data of the event, e.g. also the absolute value of the braking deceleration, which must ordinarily occur prior to the stopping of the vehicle, are assigned alphanumerically to the speed charts 40 and 41.

In contrast to FIG. 4, the speed/time charts illustrated in FIGS. 5A to 5G illustrate examples of other traffic situations, i.e. wherein each is to be considered for itself. For the sake of simplicity, the most important event data, the date and time, are entered only in FIGS. 5F and 5G.

Figure 5A:
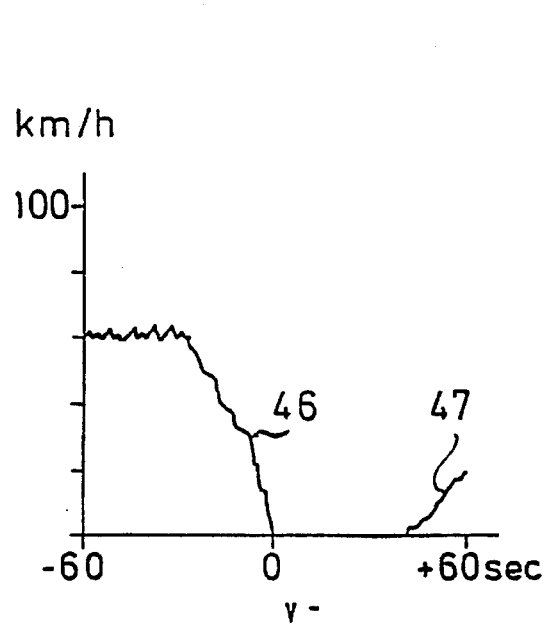
FIGS. 5A to 5G illustrate speed/time charts of different traffic situations which can be compiled in storage areas of one and/or the other storage branch.

FIG. 5A illustrates the contents of a storage area of the storage branch 15 with the permanent storage criterion v equal to 0. This can describe a normal stop at a traffic light (chart portion 46) and the subsequent continued driving (chart portion 47). However, a stop and a continued driving can also be indicative of a hit-and-run. A traffic check can subsequently determine the driving behavior at a certain point in time based upon the speed chart and the alphanumerical data which is associated with the criterion v equal to 0.

Figure 5B:
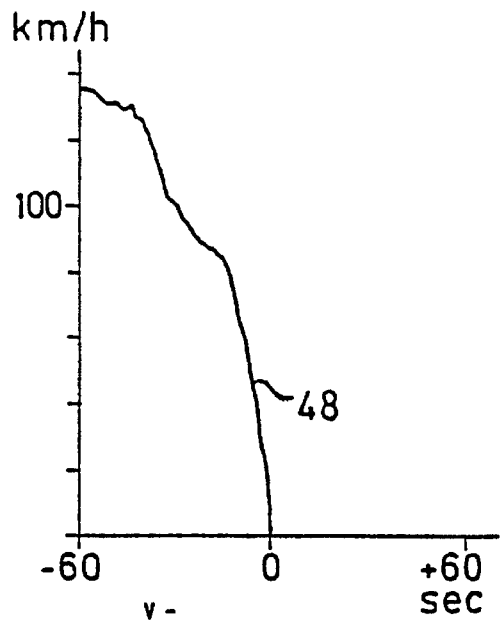

The chart 48 in FIG. 5B likewise illustrates the contents of a storage area of the storage branch 15 and also shows that the respective vehicle slows down from a relatively high speed and is brought to a stop without an emergency braking.

Figure 5C:
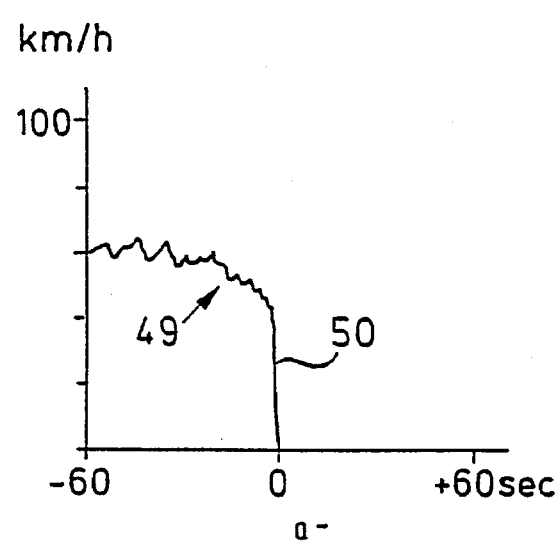

With respect to chart 49, which is illustrated in FIG. 5C, it may be assumed, on the basis of the steep drop in chart portion 50, that a full or an emergency braking is effected and that tire marks are present when a vehicle is not equipped with an anti-lock braking system. In any event, the vehicle decelerated in such a way that the criterion a greater than, for example, 5.5 m/sec$^2$, was met and accordingly, the speed values were also permanently stored in a storage area of the storage branch 16.

Figure 5D:
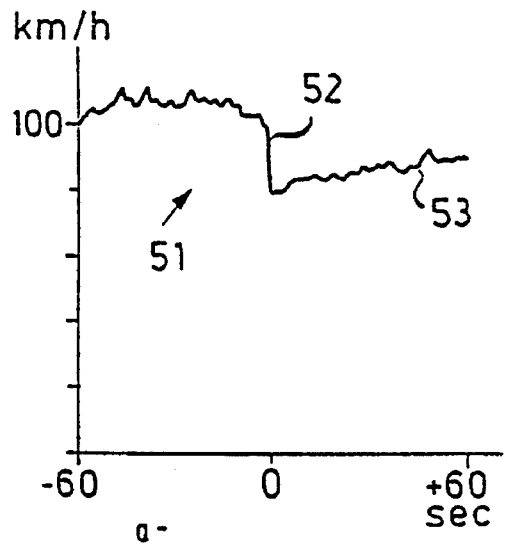

FIG. 5D likewise illustrates a chart 51, the speed values of which have been permanently stored in a storage area of the storage branch 16. That is, the criterion a greater than X was met at time 0, but the respective vehicle still did not come to a stop (chart portion 53) after a sharp deceleration (chart portion 52). In such a case, it is conceivable that the vehicle swerved to avoid an accident.

Figure 5F:
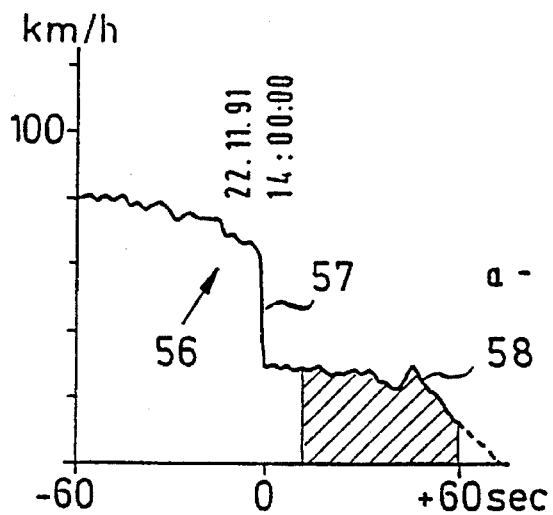
Figure 5E:
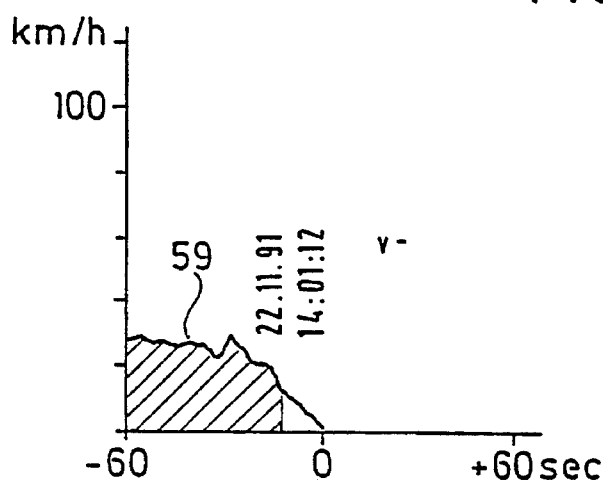
Figure 5E:
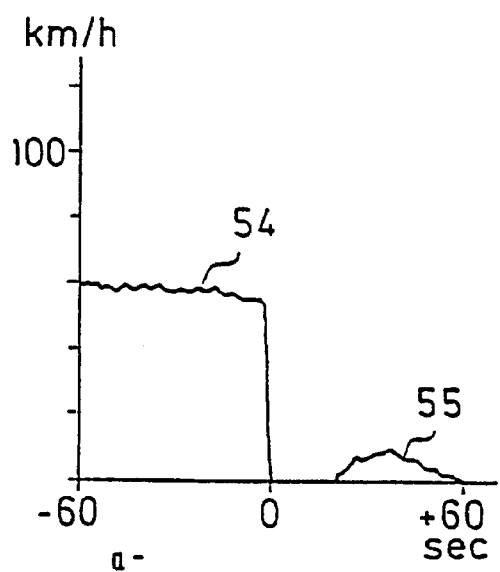

FIG. 5E illustrates a speed chart from a storage area of the storage branch 16, i.e. the criterion a greater than X was met. It can be seen from chart portion 54 that the vehicle came to a stop from a relatively uniform speed, practically without braking or with locked wheels, i.e. an accident took place and that the vehicle (chart portion 55) moved away from the scene of the accident after some time by pushing or under its own power.

FIG. 5F illustrates a comparison of storages for a traffic situation in which the vehicle, after a sharp deceleration, did not come to an immediate stop, but rather, stopped only after a period of time. This time lag extends the time window for the speed recording as a result of the two-fold storage of the speed values in the storage branch 16, on the one hand, and in the storage branch 15, on the other hand. In particular, chart 56 illustrates a sharp deceleration in chart portion 57 and a continued driving in chart portion 58. The vehicle only comes to a stop 12 seconds outside of the time window of the respective storage area in the storage branch 16. This stop causes the respective ring storage contents, which are illustrated in the chart 59, to be permanently stored in the current storage area of the storage branch 15.

Figure 5G:
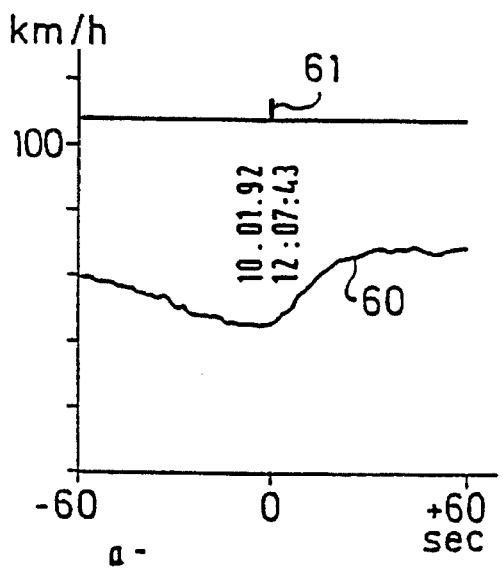

FIG. 5G illustrates the recording of a traffic situation in which the vehicle was neither stopped nor sufficiently decelerated to meet the set deceleration criterion. However, it has been determined, by one or more impact sensors, that an impact occurred at the vehicle while driving. Due to the low frequency of overwriting, the speed values and the additional event data are permanently stored, as a result of impacts, advisably in storage area 16. As can be seen from FIG. 5G, the time window shows a speed chart 60 without either a marked deceleration or a stop. To the contrary, after the incident, the speed was increased, which is typical of hit-and-run situations. The incident, in this case, an impact, is clearly illustrated visually, in addition, by a mark 61 and the print-out of at least the date and clock data. In general, the fact that a permanent storing is effected and that a chart can accordingly be recorded at all is sufficient proof of an impact incident or one of the two other events v equal to 0 or a greater than X.

While the present invention has been described in a preferred embodiment, such description is merely illustrative of the present invention and is not to be construed as a limitation thereof. In this regard, the present invention encompasses all modifications, variations and/or alternate embodiments with the scope of the present invention limited only by the claims which follow.

What is claimed is:

1. A device for short-distance recording in a motor vehicle, which comprises:

a processing means, wherein said processing means controls the operation of said device;

a means for measuring speed; and a storage arrangement for electronically storing the measured speed values in such a way that they enable an immediate evaluation of one of an accident and a near-accident driving situation by one of displaying and printing, wherein said storage arrangement is provided with at least two independent storage branches, wherein each of said storage branches has a plurality of storage areas, and wherein each of said storage areas has a first storage portion which can be is operated as a ring storage and a second storage portion which is operated as a linear storage, and further wherein at least one of the measured speed values is written into said storage branches simultaneously in a cycle required for a desired resolution, and further wherein a ring storage is exited and a further storage is effected in the subsequently arranged linear storage in a first of said two storage branches when said vehicle is stopped and in a second of said two storage branches when fixed deceleration values, which are caused by one of braking and impact, are exceeded.

2. The device of claim 1, wherein said processing means controls storage, and further wherein said processing mean writes in at least one relative value for the date and the current clock time in the presence of one of a permanent storage criteria v equal to 0 and a greater than a deceleration threshold value.

3. The device of claim 1, wherein said storage arrangement, together with said processing means, a timer, and a suitable interface circuit, are constructed as a constructional unit, wherein said constructional unit is installed in a vehicle device which processes distance-dependent pulses and in which measures are introduced for interrogating a short-distance recording device.

4. The device of claim 3, wherein said constructional unit is integrated in a line connection between said device which processes distance-dependent pulses and a distance pulse transmitter which is associated therewith.

5. The device of claim 3, wherein said constructional unit is constructed as a module with an integrated circuit.

6. The device of claim 1, which further comprises:

a printing device for visualizing stored speed values, wherein a print medium, which is in a sheet form and which is fed in and removed through a slot in said printing device, is used as a recording medium.

7. The device of claim 1, wherein contents of said two storage branches are printed out parallel to one another as a speed chart, and further wherein at least the date and the clock time are printed when at least one of a permanent storage criteria v equal to 0 and a greater than a deceleration threshold value are present in said chart.

8. The device of claim 6, wherein contents of said two storage branches are printed out parallel to one another as a speed chart, and further wherein at least the date and the clock time are printed when at least one of a permanent storage criteria v equal to 0 and a greater than a deceleration threshold value are present in said chart.

9. The device of claim 1, which further comprises:

a control device, which is usable in any vehicle and which further comprises at least one of a printing device and a display, a time/date calculator, and a means for adaptation of distance in relation to a specific vehicle.

10. The device of claim 1, wherein said storage arrangement is a tachograph device storage arrangement.

11. The device of claim 4, wherein said storage arrangement is a tachograph device storage arrangement.

12. The device of claim 6, wherein said printing device is a tachograph printing device.

* * * * *